July 28, 1964  R. V. HENSLEY  3,142,153
SOLID PROPELLANT ROCKET THRUST VECTORING SYSTEM
Filed June 9, 1961

INVENTOR.
REECE V. HENSLEY
BY
*David Young*
ATTORNEY

United States Patent Office 3,142,153
Patented July 28, 1964

3,142,153
SOLID PROPELLANT ROCKET THRUST
VECTORING SYSTEM
Reece V. Hensley, Potomac, Md., assignor to Pneumo-Dynamics Corporation, Cleveland, Ohio, a corporation of Delaware
Filed June 9, 1961, Ser. No. 116,016
5 Claims. (Cl. 60—35.55)

The instant invention relates generally to thrust vectoring systems for rockets for control of the flight of the latter, and more particularly to a new and improved rocket nozzle structure for adjusting the jet deflection to produce vectoring of the rocket for pitch, yaw and roll control.

In order to control the flight of a rocket, it is necessary to control the pitch, yaw and roll of the rocket. Various systems have been utilized for controlling the rocket flight by deflection of the rocket jet, but these have not been entirely satisfactory due to mechanical difficulties brought about by the extreme erosion and high temperature to which the nozzle is subjected. This has led to the use of auxiliary control nozzles remotely located with respect to the main rocket nozzle, which provide a secondary thrust to pitch, yaw and roll the rocket in flight. Such systems have the disadvantage of requiring additional nozzle structure, adding weight to the rocket not attributable to the principal propelling thrust, and produce a weight penalty which is detrimental to the propulsion structure, and therefore, constitutes an undesirable feature. In a rocket incorporating the instant invention the main thrust nozzles are constructed so that the main jet can be deflected in a controlled manner to provide the necessary flight control. A more efficient and practical system is achieved because the principal nozzle structure which provides the main propulsion serves the additional function of providing control thrust to produce pitch, yaw and roll of the rocket for flight control. The preferred embodiment of this invention minimizes the erosion and temperature problem, and makes the use of a deflectable skirt nozzle practical. The moving elements of the deflectable skirt nozzle embodying the instant invention are so arranged that the proper reliability and service life is achieved with a simple light weight structure suitable for use in the field of rocketry.

It is an important object of this invention to provide a new and improved rocket nozzle structure incorporating an adjustable nozzle skirt operable to deflect the jet exhausting from the nozzle in a controlled manner to provide flight direction control for the rocket.

It is another important object of this invention to provide a new and improved nozzle structure incorporating an adjustable nozzle skirt portion mounted on a fixed nozzle portion with a seal between the fixed and movable nozzle portions that is protected against the damaging erosion and temperature effects of supersonic flow of extremely hot gases.

It is another important object of this invention to provide an adjustable nozzle for a rocket which provides complete flight control by adjustment of the nozzle to deflect the direction of thrust of the propulsion jet of the rocket.

It is still another object of this invention to provide a nozzle for control of the flight of rockets and the like, having a fixed throat portion and a flaring skirt portion adjustable to deflect the jet exhausting through the nozzle, wherein the joint between the adjustable skirt portion and the fixed throat portion of the nozzle is in a zone of low pressure, and is shielded against the intense heat developed during nozzle operation.

Further objects and advantages will appear from the following description and drawings wherein.

Figure 1:
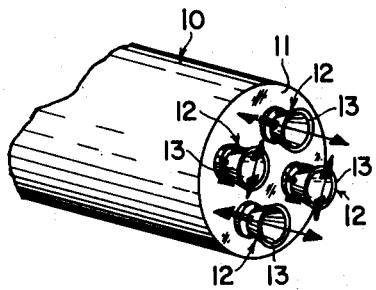
FIGURE 1 is a fragmentary perspective view showing one preferred nozzle arrangement suitable for providing complete flight control of a rocket.

Referring to the drawings, FIGURE 1 is a schematic representation of the thrust or nozzle end of a rocket 10. Mounted on the nozzle end 11 is a cluster of four rocket nozzles 12. Each of the nozzles 12 can be connected to a separate rocket motor, or to a single rocket motor, depending upon the particular capacities and design requirement of the system. Each of the nozzles 12 has a skirt 13 which can be deflected in a plane perpendicular to a plane containing the central axis of the rocket and the nozzle. Each of the jets exhausting through the nozzles 12 can therefore be deflected in the plane of deflection of skirt 13 to provide the necessary flight control of the rocket 10. If a pair of diametrically opposite nozzles 12 are deflected in opposite directions, a force couple is developed which will provide roll control of the rocket 10. Conversely, if a pair of diametrically opposite nozzles is deflected in the same direction, a force can be developed providing pitch or yaw control. Thus, by selected control of the deflection of the nozzles 12 pitch, yaw and roll control of the rocket can be achieved.

Figure 2:
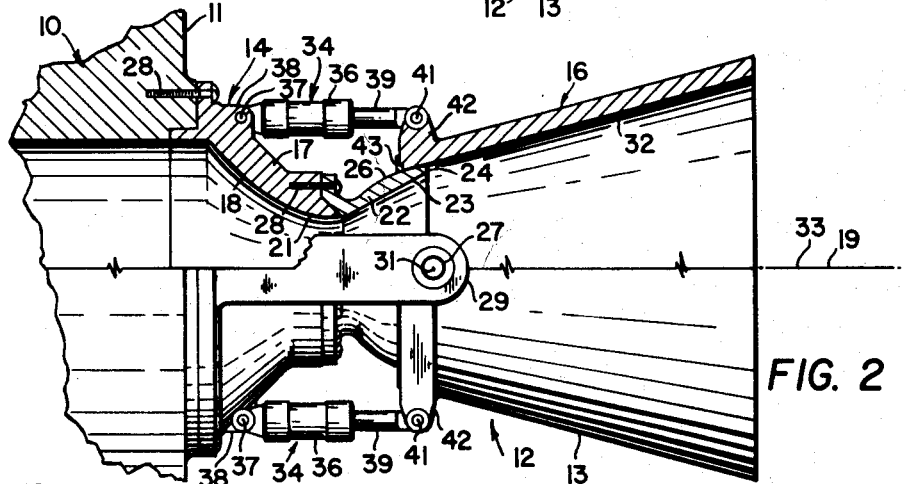
FIGURE 2 is an enlarged side elevation partially in longitudinal section illustrating a preferred embodiment incorporating this invention with the nozzle in neutral position.
Figure 3:
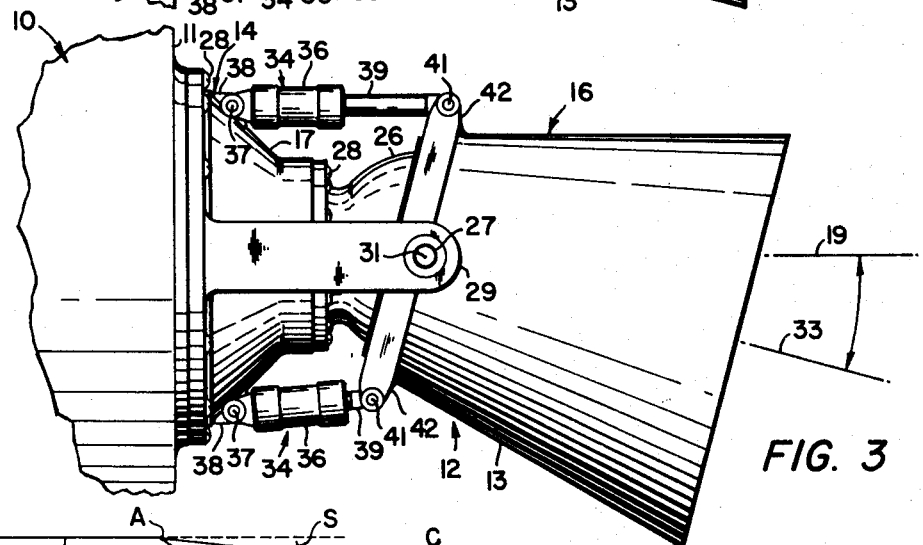
FIGURE 3 is a view similar to FIGURE 2 showing the nozzle in a deflected position.

Referring to FIGURES 2 and 3, there is illustrated therein in detail the structure of a nozzle 12. Each of the nozzles 12 embodies the same structure, and therefore, it will suffice to describe the structure of one nozzle 12, it being understood that the description applies to each of the nozzles 12.

The nozzle 12 comprises two basic assemblies, namely a fixed assembly 14 and a deflectable skirt assembly 16, the latter being the adjustable assembly which is operative to provide pitch, yaw and roll control of the rocket.

The fixed assembly 14 includes an annular inlet member 17 secured to the nozzle end 11 of the rocket 10 by a plurality of suitable bolts 28. The innerwall 18 of the inlet member 17 is formed as a surface of revolution generated around a central axis 19. The innerwall 18 extends from the forward end with a decreasing diameter to a throat 21 of minimum diameter.

Mounted on the rear end of the inlet member 17 is an outlet member 22 also formed with an innerwall 23 which is a surface of revolution generated around the central axis 19, the diameter of which increases as it extends from the throat 21 to an outer end 24. The outlet member 22 is formed with a spherical outer surface 26 ahead of the outer end 24, which has a center of curvature at the point of intersection of the transverse axis 31 with the central axis 19. A plurality of suitable bolts 28 mount the outlet member 22 on the inlet member 17, and are preferably disposed adjacent to the outer surface, so that they will be located remote from the hot gas flowing through the nozzle 12.

A pair of opposed trunnion arms 29 are formed integrally with the inlet member 17 and extend rearwardly in an axial direction along the opposite sides of the nozzle 12 and provide a trunnion mounting for the deflectable skirt assembly 16, which is thus mounted for rotation on oppositely disposed diametrically extending trunnions 27 having an axis of rotation 31 which intersects the central axis 19. Therefore, the skirt assembly 16 can be deflected from the neutral position in either direction upwardly or downwardly about the axis 31, as seen in FIGURE 3.

The skirt 13 is formed with a flaring innerwall 32 which is a surface of revolution generated around the central axis 33 of the skirt. When the skirt 13 is in the neutral position, as seen in FIGURE 2 the two axes 19, 33 are coincident, but when the skirt 13 is deflected, as seen in FIGURE 3 the axis 33 is divergent with respect to the central axis 19 but intersects it at the point of intersection of the transverse axis 31 with the axis 19.

In order to control the position of the skirt assembly 16, a pair of diametrically oppositely disposed pneumatic actuators 34 are connected between the fixed assembly 14 and the skirt assembly 16. The actuators 34 include a cylinder 36 pivotally mounted on pin 37 in a boss 38 formed on the inlet member 17. The piston 39 is pivotally mounted on pin 41 in a boss 42 formed on the skirt assembly 16. Actuators 34 of the cylinder and piston type are preferred because of the high environmental temperature. The seals in the actuators 34 can therefore be such that a limited amount of leakage can be tolerated without causing system failure. The actuators 34 are controlled by a suitable guidance system incorporated in the rocket 10, through suitable valving devices and the like which are not included in the instant invention.

Although cylinder and piston pneumatic actuators 34 have been illustrated as the preferred structure, it will be understood that other types of actuators, such as screw jack actuators, could be utilized. Also, the use of two diametrically oppositely disposed actuators 34 is not essential, and, by way of example one double acting actuator can be utilized to provide the desired control.

Figure 4:
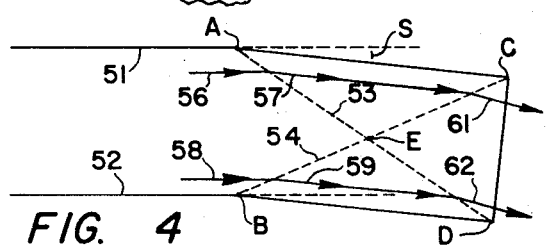
FIGURE 4 is a schematic illustration of the flow through a deflectable nozzle illustrating the aerodynamic functions of the preferred nozzle.

Reference is now made to FIGURE 4 for a description of the aerodynamic characteristics of the deflectable nozzle incorporating this invention. In a deflectable nozzle incorporating this invention the jet deflection is greater than the geometric deflection of the skirt or exit section of the nozzle. This phenomenon which is schematically illustrated in FIGURE 4 is described hereinafter with the assumption that the flow is two dimensional, and that the channel depth is constant rather than three dimensional as in the actual application. Inlet flow at a Mach number greater than one is from the left. At the points A and B the upper and lower channel walls 51, 52, respectively, are deflected through a small angle S. This angle S is assumed to be small enough so that for the purposes of this discussion the compression accompanying the turn at the point A can be considered isentropic. A compression wave 53 is set up at the point A and extends obliquely across the channel and intersects the lower wall at D. Similarly, an expansion wave 54 emanates from the point B and extends obliquely across the channel and intersects the upper wall 51 at C. These two waves 53, 54 intersect within the channel at point E and interact. However, as a first approximation to the axial field, in the case of small wall angles S they can be considered to cross but to have no mutual interaction.

In the triangular region defined by the points AEC all stream lines crossing the compression wave 53 are deflected downward by an angle S as shown by the portions of stream lines 56, 57. Similarly, in the triangular region defined by the points BED stream lines crossing the expansion wave 54 are deflected downward by an angle S as shown by the portions of the stream lines 58, 59.

All stream lines crossing the expansion wave 54 after passing through the compression wave 53 are deflected through an additional angle S, providing that the wall between A and C terminates at C to prevent the reflection of the expansion wave 54 at the upper wall. In an identical manner all stream lines passing through the compression wave 53 after first crossing the expansion wave 54 are deflected through an additional angle S providing the lower wall terminates at D to prevent a reflected compression wave at this point. The double deflected stream lines are represented by the portions numbered 61 and 62.

All of the stream lines in the triangular region defined by the points CED have passed successively through a compression wave and an expansion wave, or vice versa, and are therefore deflected through an angle of 2S. This is obviously a simplified explanation of the phenomenon. In actual practice this maximum deflection of 2S would never be obtained because of such things as non-isentropic compression along the line 53, the inclusion of real gas effects, the lack of exact two dimensional flow, length restrictions, etc. However, experimental results using three dimensional flows have provided major deflections up to approximately 1.6 times the geometric nozzle deflection angle. Further nozzle designs incorporating dimensions compatible with current nozzle length limitations in solid propellant missiles or rockets have been tested and found to provide jet deflections greater than 1.2 times the geometric deflection.

The structure illustrated shows a deflectable skirt nozzle employing a single plane of deflection of the exit skirt about a normal transverse axis. This arrangement is representative of most of the applications that have been considered. In such applications a plurality of nozzles, as illustrated in FIGURE 1, is used with two or more hinge line axes to provide yaw, pitch and roll control of the direction of flight. The deflectable skirt nozzle is, however, made up of axially symmetrical sections and in effect employs a ball and socket joint. The two major sections of the nozzle can obviously then be coupled through a gimbal arrangement which would provide 360° deflection of the exhaust jet. In such installations a single nozzle or two cooperating nozzles could be used to provide the desired control of the rocket.

Referring back to FIGURES 2 and 3, a flexible nozzle or deflectable nozzle according to this invention incorporates a joint between the skirt assembly 16 and the fixed assembly 14 which is located in the lower pressure down stream zone following the throat 21. A scraper or sealing ring 43 is mounted on the forward end of the skirt assembly 16 and engages the spherical surface or wall 26. Since the skirt assembly 16 is journaled for rotation about an axis intersecting the center of curvature of the spherical wall 26 the sealing ring 43 rides smoothly on the outlet member 22. The sealing ring is also positioned forward from the outer end 24 away from the stream of hot gases flowing through the nozzle. This joint and seal function satisfactorily because it is not exposed to high pressure and is protected from the high temperature of the gases by the outlet member 22.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A convergent, divergent rocket nozzle comprising a fixed section having a flow passage including the nozzle throat open at its divergent outer end, a skirt member having a flow passage open to the outer end of the fixed section flow passage and closely overlapping said outer end to form a substantially tight joint, means mounting said skirt for sliding pivotal movement relative to said fixed section between a first position wherein said flow passages are aligned and deflected positions wherein said flow passages are inclined relative to each other, gases flowing through said passages with a velocity greater than Mach one, said fixed section and skirt member cooperating when in said deflected positions to establish a compression wave and an expansion wave each emanating from the joint between said fixed section and skirt member and crossing within said skirt member flow passage whereby said gases flowing through said passages are deflected by passage through said waves to a deflectable angle greater than the angle of deflection of said skirt member.

2. A convergent, divergent rocket nozzle comprising a fixed section including a minimum cross section throat and a flaring portion downstream therefrom terminating at the outer end with said flaring portion having a curved surface thereon, a pair of trunnions extending from said fixed section, a skirt member having a curved surface thereon cooperable with said curved surface on said flaring portion of said fixed section to form a substantially tight joint therebetween, said skirt being mounted for pivotal movement about said trunnions relative to said fixed section between a first position wherein said flow passages are alined and deflected positions wherein said flow passages are inclined relative to each other, means cooperable with said skirt to effect said pivotal movement, gases flowing through said passages with a velocity greater than Mach one, said fixed section and skirt member cooperating when in said deflected positions to establish a compression wave and an expansion wave each emanating from the joint between said fixed section and skirt member and crossing within said skirt member flow passage whereby said gases flowing through said passages are deflected by passage through said waves to a deflectable angle greater than the angle of deflection of said skirt member.

3. A convergent, divergent rocket nozzle according to claim 2 wherein said means cooperable with said skirt comprises a power actuator engageable with said fixed section and skirt operable to effect selective pivotal movement of said skirt relative to said fixed section upon actuation thereof.

4. A convergent, divergent rocket nozzle comprising a fixed section having a flow passage including the nozzle throat and a flaring portion downstream thereof open at its outer end with said flaring portion having a curved surface thereon, a skirt member of substantially circular cross-section engageable with said fixed section to form a substantially tight joint therebetween, means for mounting and providing pivotal movement of said skirt member on said fixed section for pivotal movement of said skirt member between a position wherein said flow passages are alined and deflected positions wherein said flow passages are inclined relative to each other, seal means on said skirt engageable with said curved surface on said flared portion, gases flowing through said passages with a velocity greater than Mach one with said seal being operable to prevent passage of said gases between said fixed section and said skirt, said fixed section and skirt member cooperating when in said deflected positions to establish a compression wave and an expansion wave each emanating from the joint between said fixed section and skirt member and crossing within said skirt member flow passage whereby said gases flowing through said passages are deflected by passage through said waves to a deflectable angle greater than the angle of deflection of said skirt member.

5. A convergent, divergent rocket nozzle comprising a fixed assembly having an axially extending innerwall generated as a surface of revolution about a central axis defining a flow passage, said innerwall including an inlet portion extending with reducing radius to a medium radius throat and an exhaust portion extending with increasing radius from said throat to an outer end, a skirt having an innerwall generated as a surface of revolution about a skirt axis defining a flow passage, means mounting said skirt on said fixed assembly to form a substantially tight joint therebetween, said skirt being movable from an alined flow passage position wherein said skirt axis and central axis are coaxial and deflected positions wherein they are non-coaxial, a substantially spherical outer surface on said fixed assembly adjacent to said outer end having a center of curvature at said predetermined point, a seal on said skirt engaging said surface, gases flowing through said passages with a velocity greater than Mach one, said seal effective to prevent passage of said gases between said fixed section and said skirt, actuator means operatively connected to said skirt for moving said skirt between said alined flow passage position and said deflected positions with said fixed section and skirt member cooperating when in said deflected positions to establish a compression wave and an expansion wave each emanating from the joint between said skirt member and said fixed assembly crossing within said skirt member flow passage whereby said gases flowing through said passages are deflected by passage through said waves at a deflectable angle greater than the angle of deflection of said skirt member.

References Cited in the file of this patent

UNITED STATES PATENTS

| 2,780,059 | Fiedler | Feb. 5, 1957 |
| 2,903,851 | Fiedler | Sept. 15, 1959 |
| 2,919,546 | David | Jan. 5, 1960 |

FOREIGN PATENTS

| 1,025,827 | France | Jan. 28, 1953 |
| 1,022,847 | Germany | Jan. 16, 1958 |
| 727,255 | Great Britain | Mar. 30, 1955 |

OTHER REFERENCES

Rocket Encyclopedia Illustrated (Herrick et al., ed.), pages 204–205, published by Aero Publishers, Los Angeles, California, April 28, 1959.